Feb. 3, 1953     T. W. BEYER     2,627,143
MACHINE FOR GRINDING FILES
Filed July 5, 1950     2 SHEETS—SHEET 1
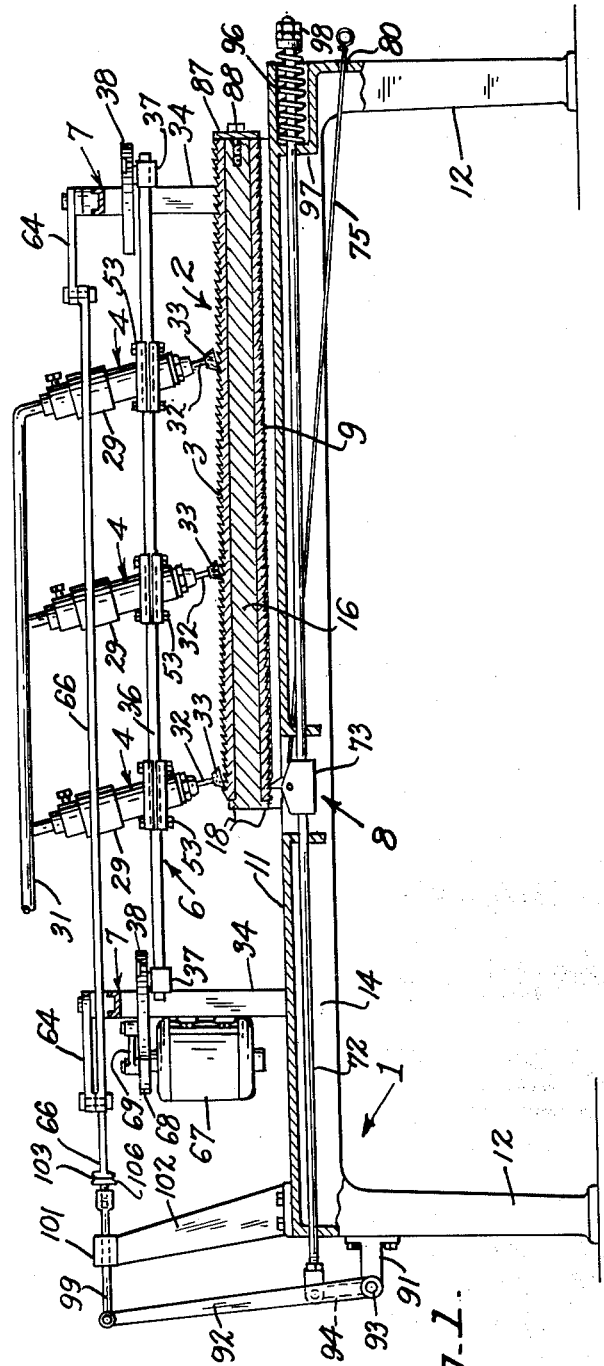
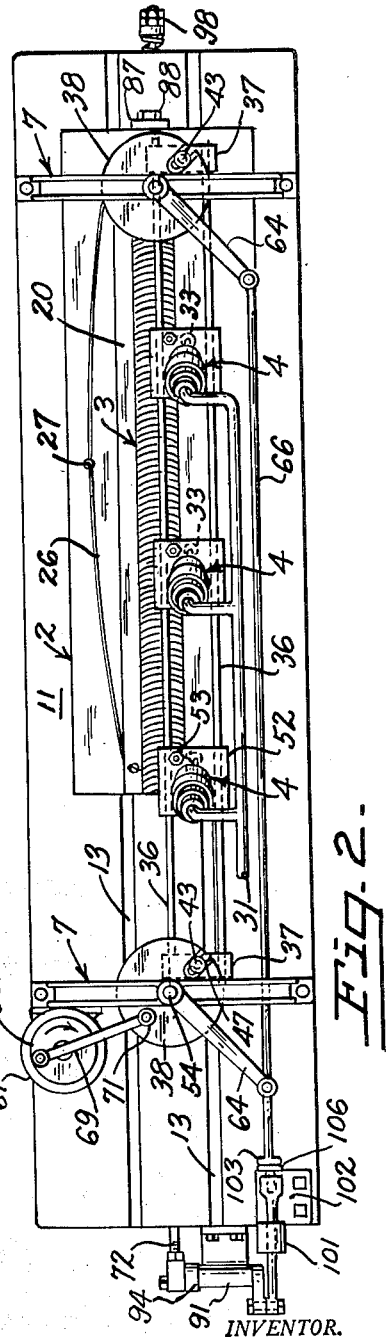
INVENTOR.
THOMAS W. BEYER
BY George B. White
ATTORNEY Feb. 3, 1953 T. W. BEYER 2,627,143
MACHINE FOR GRINDING FILES
Filed July 5, 1950 2 SHEETS—SHEET 2
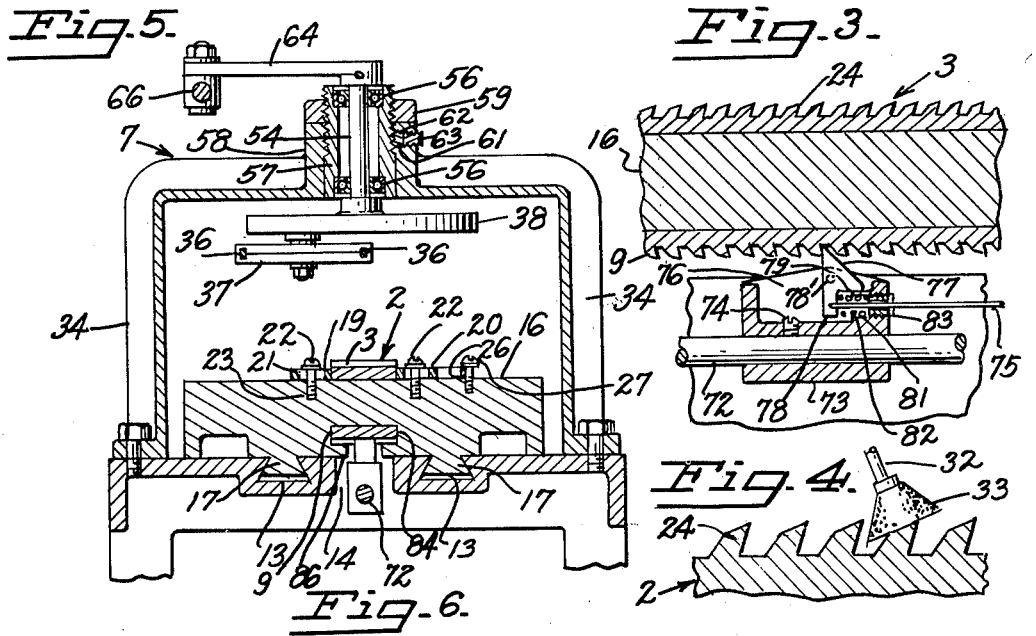
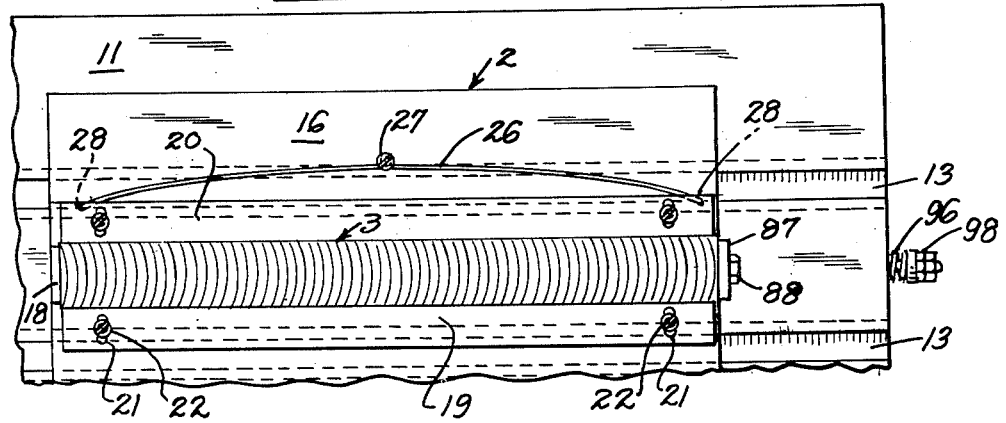
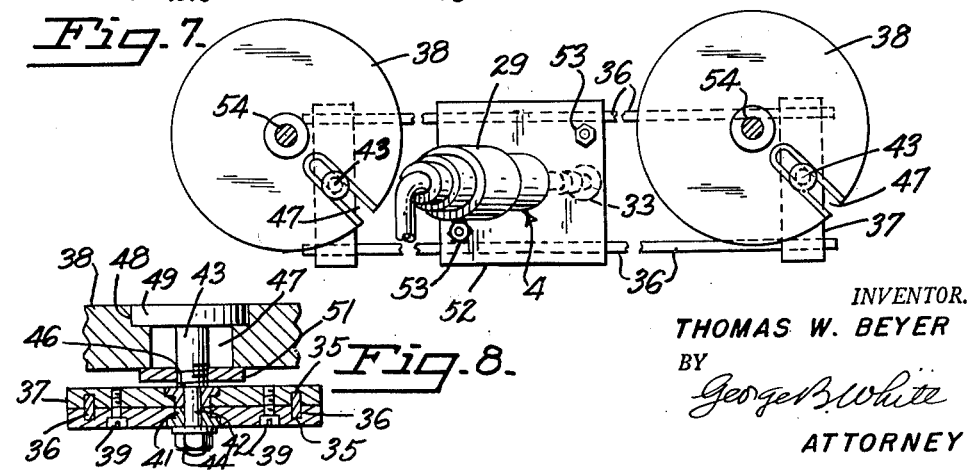
INVENTOR.
THOMAS W. BEYER
BY
George B. White
ATTORNEY

UNITED STATES PATENT OFFICE 2,627,143

MACHINE FOR GRINDING FILES

Thomas W. Beyer, San Rafael, Calif.

Application July 5, 1950, Serial No. 174,110

15 Claims. (Cl. 51—55)

This invention relates to a machine for grinding the teeth of an arcuate-tooth file.

The primary object of the invention is to provide a machine wherein the file to be sharpened or ground is held securely on a carriage and the grinding tool is oscillated transversely with respect to the file so that the arc of oscillation conforms to the arc of the teeth on the file; means being provided to adjust the arc of oscillation of the grinding tool; and means being provided for advancing the carriage with the file thereon in such a manner as to bring consecutive teeth to the oscillating grinding tool.

A further object of the invention is to provide a grinding tool which is oscillated across a path conforming to the arc of the teeth on the file so that the grinding portion of the tool engages generally the heel of a tooth of said file; the file being supported on a carriage capable of advancing with respect to said grinding tool, and said carriage having mounting means for a master file, said advancing mechanism coacting with the master file for advancing the carriage and the file to be ground tooth by tooth with respect to the grinding tool.

Another object of the invention is to provide a grinding tool for an arcuate-tooth file which tool is supported on an oscillating frame in such a manner that the arc of oscillation can be selectively adjusted so as to conform to the arc of the tooth of the file to be ground.

In general the object of applicant's invention is to provide a grinding tool which can be easily adjusted so as to grind one tooth, or simultaneously several teeth of a file, and which can be easily and quickly adjusted to conform in its oscillation to the arc of the teeth of the file to be ground, and which has a device coordinated therewith to advance a file to the said tool for consecutive grinding of the teeth.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a partly sectional side view of my grinding machine.

Fig. 2 is a top plan view of my grinding machine.

Fig. 3 is a sectional fragmental view showing the carriage advancing mechanism.

Fig. 4 is an enlarged fragmental view in section showing the angle of engagement of the grinding element with the tooth of said file.

Fig. 5 is a substantially cross sectional view of my grinding machine.

Fig. 6 is a fragmental top plan view on a larger scale of the mounting device for the file on the carriage.

Fig. 7 is a fragmental top plan view on a larger scale showing the oscillating device and its adjustability.

Fig. 8 is a sectional view showing the adjustable pivotal mounting of the oscillating frame on the oscillating disk.

In its general organization my machine includes a base 1 on which is longitudinally movable a carriage 2 to carry on its top the file 3 to be ground; and a grinding tool 4 movable across the file to grind the arcuate teeth of said file. One or more grinding tools 4 are supported on an oscillating frame 6 which latter is held spaced above the file 3 by suitable frame brackets 7. An advancing device 8 extends through the base 1 and to the underside of the carriage 2 to engage there a master file 9 for advancing the carriage 2 by a suitable intermittent movement for the consecutive grinding of the teeth of the file 3.

The base 1 includes a base plate 11 which is suitably supported, for instance on legs 12. A pair of parallel spaced dovetail grooves or channels 13 extend the entire length of the base plate 11 for the purpose of guiding the carriage 2. A central channel or passage 14 extends through the entire length of the table or base plate 11 spaced below the top surface thereof to accommodate parts of the advancing device 8.

The carriage 2 may be any suitable type of chuck such as the clamping type herein shown or a magnetic chuck suitable in some instances. The carriage 2 includes a chuck body 16 which has on its bottom face a pair of spaced dovetail rails 17 which slidably engage and move within the dovetail grooves or channels 13 of the base plate 11. At the leading end of the chuck body 16 are a pair of aligning flanges 18 for the purpose of aligning the leading ends of the file 3 and the master file 9. The file 3 is placed on the top of the chuck body 16 with its leading end abutting against the adjacent aligning flange 18. The file 3 is held against transverse or lateral shifting by a pair of adjustable retaining bars 19 and 20. The retaining bar 19 has on it a pair of spaced and transverse screw slots 21 through which are extended the clamping screws 22 into threaded engagement with threaded holes 23 in the top of the chuck body 16. The bar 19 is pressed against one side of the file 3 and then the clamping screws 22 are tightened to hold the file 3 in the aligned position. In order to facilitate the alignment of the file, especially in the event the arcuate teeth 24 of the file 3 are on an arc the chord of which is not truly at right angles to the longitudinal side or axis of the file 3, there is provided a bow spring 26 which at its middle bears against a fixed screw 27 in the top of the chuck body 16 spaced from the floating bar 20 adjacent the file 3. The ends of the bow spring 26 extend into outwardly inclined notches 28 of the bar 20 so as to hold said floating bar 20 against the adjacent side of the file 3. The screws 22 extended through the transverse slots 21 in the floating bar 20 are not tightened, but serve to limit the movement of said floating bar 20 as the latter follows the angular adjustment of the file 3. Thus the file 3 is adjusted and held at an angle with respect to the longitudinal axis of the chuck body 16 so as to align the arcs of the the teeth 24 of the file 3 with respect to the arc of movement of the grinding tool 4 between the bars 19 and 20.

The grinding tools 4 herein are so called turbine grinders which have a mechanism therein, not shown, rotated by compressed air. The intake ends of the turbine grinders 29 are connected by a flexible conduit 31 to a source of compressed air, not shown. On the spindle 32 of each tool 4 is a grinding cone 33 which has its grinding base at suitable angle for the usual cutting edge of the file teeth 24, in the present instance fitting the angle of the heel of the tooth, so as to contact the heel surface.

The grinding tool oscillating frame 6 is supported on the frame brackets 7, which latter have legs 34 suitably fixed to the base plate 11 so as to straddle the chuck body 16 and to extend above the base plate 11 and leave space above the file 3 free and unobstructed.

The oscillating mechanism includes the frame 6 which is formed of a plurality of parallel bars 36 which extend longitudinally and are spaced above the base plate 11 and above the chuck body 16. The ends of the parallel bars 36 are held in cross heads 37 in fixed relation to one another. The respective cross heads 37 are adjustably and pivotally mounted on oscillating circular discs 38, each of which latter is journalled in the top of the adjacent supporting bracket 7. Each cross head 37 includes a pair of plates with complemental sockets 35 to grip the respective halves of the ends of the frame bars 36. The separate plates of each cross head 37 are clamped together tightly by any suitable means such as set screws 39.

Substantially intermediate between the ends of each cross head 37 is a bushing 41 in which is journalled a pivot neck 42 of a pivot bolt 43. A nut 44 on the lower end of the bolt 43 clamps the bushing 41 against a shoulder 46 at the base of the pivot neck 42 of the bolt 43 so that the cross head may swing and pivot on said neck 42.

The top of the bolt 43 extends through a hole 47 in the adjacent disc 38. The top of the hole 47 is countersunk to form a seat 48 for the head 49 of the bolt 43. A clamping nut 51 is threaded on the bolt 43 above the neck and is tightened against the under side of the disc 38 for clamping the head 49 of the bolt 43 tightly into the seat 48 and thereby to hold the pivot bolt 43 in fixed position. For the adjustment of the radius of oscillation, the hole 47 is elongated and extends from the periphery of the disc 38 radially toward the center of the disc 38. When the clamping nut 51 is loosened, the bolt head 49 and the bolt 43 can be slid radially in the seat 49 and in the hole 47 respectively and when the desired radius is reached the clamping nut 51 can be tightened and the radius of oscillation is determined. Both ends of the frame, in other words, both cross heads 37 are to be adjusted generally to the same radial distance from the respective centers of the discs 38.

The grinding tools 4 are supported adjustably lengthwise of the frame 6. Each turbine grinder 29 is fixed in a pair of parallel plates 52 which are spaced so as to engage the upper and lower sides of the frame bars 36. The upper plate 52 is suitably fixed to the casing of the turbine grinder 29. The lower plate 52 is movable so as to allow the loosening or tightening of the clamping plates 52 on the frame bars 36. In this manner, when the plates 52 are slightly loosened they can be slid along the bars 36 to the selected tool spacing and then the bolts 53 extending through the plates 52 are tightened to clamp the grinding tool in the adjusted position. The upper plate 52 holds the turbine grinder 29 at the desired angular position.

The oscillation of this entire frame and the grinding tool is performed through a shaft 54 extending from the center of each disc 38 and held rotatably on thrust ball bearings 56 in a bushing 57. The bushing 57 is exteriorly threaded and extends through a bearing 58 in the middle of the top of the frame bracket 7 as shown in Fig. 5. A nut 59 threaded on the bushing 57 and resting on the top of the bearing 58 determines the vertical adjustment of the bearing bushing 57 and thereby the vertical adjustment of the disc 38 and of the oscillating frame 6 with respect to the file 3. In order to fix the device in a vertical adjusted position a suitable threaded setting block 61 is positioned in a hole 62 in the side of the bearing 58 and is pressed by a set screw 63 inwardly against the threaded periphery of the bearing bushing 57 thereby to hold the bushing 57 in the adjusted position.

The top of each shaft 54 extends above the top of the bushing 57 and has a crank arm 64 connected to it. The crank arms 64 of both shafts 56 are connected for synchronous operation by a connecting rod 66. Oscillation may be performed by manually reciprocating the connecting rod 66 back and forth which turns the shafts 56 back and forth and thereby oscillates the discs 38 and the oscillating frame 6 and the grinding tools 4 thereon. The oscillation may be accomplished also by suitable power drive. For instance, in the present illustration an electric motor 67 is mounted on one of the legs 34 of one of the brackets 7, and it rotates a cam disc 68 which through an eccentric connecting rod 69 is connected to an eccentric pivot 71 on the circular disc 38 so that as the motor rotates the disc 68 and eccentric connecting rod 69 reciprocate and thereby rock the adjacent disc 38 back and forth, which rocking is transmitted through the shafts 54, the cranks 64 and the connecting rod 66 to the other circular disc 38. In this manner the oscillating frame 7 and the grinding tools 4 are oscillated on a true arc as determined by the adjustment of the cross heads 37 with respect to the centers of the discs 38.

The advancing device 8 in the present illustration includes a bar 72 which is extended through the central passage or channel 14 of the base plate 11. On the bar is a bracket sleeve 73 suitably fixed such as by a set screw 74. In the top of the bracket sleeve 73 is formed a recess 76 in which is pivoted a pawl 77 on a pivot 78' transverse with respect to the recess 76. The pawl 77 is generally triangular with an ear 78 extended downwardly from a side of the same. The recess 76 has a ledge 79 engaged by one side of the triangular pawl 77. A coil spring 81 in a hole 82 opposite the ear 78 and under the ledge 79 is held by a set screw 83 against the ear 78 so as to force the pawl 77 against the ledge 79. The upper tip of the pawl 77 fits into the space between adjacent teeth of the master file 9.

The master file 9 is placed in a recess 84 extended from the rear under the chuck body 16 to the lower aligning flange 18, and this master file 9 rests with its teeth downwardly upon spaced flanges 86 at the bottom of the chuck channel or recess 84. The pawl 77 extends through the space between the flanges 86 and into the adjacent space between the teeth of the master file 9. The rearward shifting of the file 3 and the master file 9 is prevented by a clamping plate 87 which is held on the trailing end of the chuck body 16 by a screw 88 in abutment with the trailing ends of the file 3 and the master file 9. A pawl release wire 75 is extended from the pawl ear 78 through the spring 81 and set screw 83 and out through a hole 80 in the rear end of the base plate 11, so that after a file is ground, the pawl can be held released by a pull on the wire 75 while the carriage 2 is returned to the initial position.

In order to replace the file 3 or the master file 9 the clamping plate 87 is removed and the files can be slid into or out of the chuck body 16.

For the purpose of advancing the master file 9 by the pawl 77 a bracket 91 is provided at one end of the base 1 and it has a lever 92 pivoted in it. The pivotshaft 93 of the lever 92 extends through the bracket 91 and on its other side has a crank arm 94 which is suitably connected to the outer end of the adjacent end of the advancing bar 72. Thus when the lever 92 is moved away from the base plate 11 it rocks the crank arm 94 and thereby pulls the bar 72. The bar 72 in turn pulls the pawl 77 and advances the master file 9 and the entire chuck body 16 therewith. When the lever 92 is released the bar 72 is returned to the initial position by a coil spring 96 which at its inner end bears against a fixed shoulder 97 and at its outer end against a nut 98 on the bar 72. Thus the coil spring 96 pulls the bar 72 and the pawl 77 back to its initial position and the pawl 77 engages the next tooth of the master file 9 ready for the next advancing operation.

The advancing in this illustrative form is accomplished in synchronism with and is actuated by the oscillating mechanism. From the top of the lever 92 extends a rod 99 through the bearing 101 of a bearing bracket 102 fixed on the base plate 11. The rod 99 is held in axial alignment with the connecting rod 66. The end of the connecting rod 66 nearest to the lever 92 has an extension thereon with an abutment head 103 at its end. In the end of the rod 99 is threadedly secured an abutment head 106 in alignment with the abutment head 103 on the end of the connecting rod 66. Whenever the connecting rod 66 reaches the end of its return stroke as indicated on Fig. 2, it abuts against the abutment head 106 and pushes the rod 99 outwardly and away from the base 1, turning the lever 92 correspondingly so as to pull the bar 72 and the pawl 77 in the manner heretofore described. The stroke of the pulling can be adjusted to conform to the spacing between the teeth, by the threaded adjustment of the abutment head 106 in the end of the rod 99 which determines the stroke of operation of the pawl.

In operation a master file 9 corresponding to the file 3 to be ground is inserted into the channel in the bottom of the chuck body 16, and the file 3 to be ground is inserted and held on the top of said chuck body 16. The frame 6 is first adjusted for the radius of oscillation of the grinding tool 4 corresponding to the radius of the arc of the teeth. In the event the transverse arc of the tooth of the file is not truly cut, namely the chord of the arc of the tooth is not at right angles to the longitudinal axis of the file 3, then the grinding tool 4 is moved manually across the file 3 so that it pushes the file 3 to the angle corresponding to the arc of the tool. Then the angle is adjusted by tightening the fixed bars 19 to hold the file 3 at the angle where the grinding tool moves across in contact with the heel of the teeth of the file 3.

In order to accelerate the operation, a plurality of grinding tools 4 are provided in equally spaced relationship; preferably spaced apart to a distance corresponding to one third of the length of the file 3 so that each grinding tool 4 grinds the teeth on one third of the length of the file 3 and thereby all the teeth of the file 3 can be ground by advancing the file 3 only to a distance equal to one third of its length. After the adjustment and clamping of the file in place the abutment head 106 is adjusted to correspond to the proper stroke according to the spacing of the teeth on the master file 9. The height of the tool is suitably adjusted by the bearing bushing 57 and is fixed in that position. Then the turbine grinders are set into operation in the usual manner and the oscillating frame is moved back and forth across the file manually or by the power drive herein described. For the purpose of the automatic advancing, the abutment head 106 is offset to one side so that it is engaged only when the grinding tool passes beyond the file 3.

The device herein greatly accelerates and facilitates the grinding of files of the type with the arcuate teeth; it is simple to set up and operate; it accurately and uniformly grinds the teeth of the file; it furnishes uniformly sharper and aligned cutting edges on the file; it extends the life of the file and allows the grinding and resharpening of the teeth of the file several times more than is permitted by methods and devices used in the past.

I claim:

1. In a machine for grinding the heel of an arcuate tooth of a file, a carriage to hold the file to be ground, a grinding element with a flat grinding face fitting over the angle of said heel, a grinding tool for supporting and rotating said grinding element in contact with said heel of said tooth, and an oscillating device to oscillate said grinding tool and said grinding element across said file on an arc conforming to the arc of said tooth, said carriage including a generally flat support adapted to support said file on its top, a master file held on the underside of said flat support in alignment with said first file, and means coacting with said oscillating device and engaging said master file to advance said support and said files one tooth distance after the completion of each oscillation of said oscillating device.

2. In a machine for grinding the heel of an arcuate tooth of a file, a carriage to hold the file to be ground, a grinding element with a flat grinding face fitting over the angle of said heel, a grinding tool for supporting and rotating said grinding element in contact with said heel of said tooth, and an oscillating device to oscillate said grinding tool and said grinding element across said file on an arc conforming to the arc of said tooth, and means to advance said carriage after the completion of each of said oscillations so as to move the next following tooth of the file in registry with said grinding element, said carriage including a support adapted to hold said file on its side facing said tool, a master file held on the opposite side of said support, means to hold said files in alignment, said advancing means coacting with said master file.

3. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said advancing device including a master file having the same spacing between the teeth as the file to be ground, a device intermittently engageable with successive teeth of the master file to move said master file, said file being held on one face of carriage, said master file being on the opposite face of the carriage, and means to hold said files aligned on said carriage so that said carriage and said files are moved together by said intermittently engageable device.

4. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool oscillating means including a pair of spaced rotatable elements, a journal support to support each element spaced above the level of said carriage on a generally perpendicular journal axis, a frame pivotally connected to said elements, a tool mounting on said frame to hold said tool in operative relation to said file on said carriage, and rocking arms extended from each element and connected together for oscillating said elements in synchronism about their respective axes.

5. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool oscillating means including a pair of spaced rotatable elements, a journal support to support each element spaced above the level of said carriage on a generally perpendicular journal axis, a frame pivotally connected to said elements, a tool mounting on said frame to hold said tool in operative relation to said file on said carriage, and rocking arms extended from each element and connected together for oscillating said elements in synchronism about their respective axes, said tool mounting being adjustable longitudinally along said frame.

6. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool oscillating means including a pair of spaced rotatable elements, a journal support to support each element spaced above the level of said carriage on a generally perpendicular journal axis, a frame supported on said elements, a tool mounting on said frame to hold said tool in operative relation to said file on said carriage, and rocking arms extended from each element and connected together for oscillating said elements in synchronism about their respective axes, and radially adjustable pivot mounting on each element for supporting said frame for selected arcuate movement with respect to said carriage.

7. In a machine for grinding the teeth of an arcuate-tooth file, a base, a carriage movable on the base, a device to clamp a file to be ground on said carriage at selected angular position with respect to the movement of the carriage, an oscillating frame, means to support said oscillating frame spaced above said carriage for oscillation on an arc transversely with respect to the file on the frame, grinding tools, adjustable mounting means to hold said grinding tools in selected spaced relation from one another along said frame and in grinding contact with said file, and selectively adjustable means to determine the arc of oscillation of said frame and said grinding tools generally to conform to the arc of the teeth of said file.

8. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal supports, an element journalled in each support, a frame spaced above said carriage, pivotal connections between each end of said frame and the adjacent element being eccentric with respect to the journal axis of said element, and mounting means to support said tool on said frame in operative relation to said file.

9. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal supports, an element journalled in each support, a frame spaced above said carriage, pivotal connections between each end of said frame and the adjacent element being eccentric with respect to the journal axis of said element, and mounting means to support said tool on said frame in operative relation to said file, and means to adjust the eccentricity of said pivotal connection to determine the arc of oscillation of said frame and tool around said journal axes.

10. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal supports, an element journalled in each support, a frame spaced above said carriage, pivotal connections between each end of said frame and the adjacent element being eccentric with respect to the journal axis of said element, and mounting means to support said tool on said frame in operative relation to said file, and connecting means for synchronous rocking of said elements.

11. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal brackets extended above the level of said carriage, a vertically adjustable journal in each bracket, a rocking element rotatably journalled in each journal, a frame eccentrically pivoted on said elements and moved on an arc when said elements are oscillated about their respective journals, and mounting means on said frame to hold a grinding tool in operative relation to said file for grinding the teeth of the file.

12. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal brackets extended above the level of said carriage, a vertically adjustable journal in each bracket, a rocking element rotatably journalled in each journal, a frame eccentrically pivoted on said elements and moved on an arc when said elements are oscillated about their respective journals, and mounting means on said frame to hold a grinding tool in operative relation to said file for grinding the teeth of the file, and means to adjust the eccentricity of the frame with respect to said journals.

13. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal brackets extended above the level of said carriage, a vertically adjustable journal in each bracket, a rocking element rotatably journalled in each journal, a frame eccentrically pivoted on said elements and moved on an arc when said elements are oscillated about their respective journals, and mounting means on said frame to hold a grinding tool in operative relation to said file for grinding the teeth of the file, and means to adjust the eccentricity of the frame with respect to said journals, said tool mounting means being longitudinally adjustable on said frame for locating said tool with respect to the teeth of said file.

14. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal supports, an element journalled in each support, a frame spaced above said carriage, pivotal connections between each end of said frame and the adjacent element being eccentric with respect to the journal axis of said element, and mounting means to support said tool on said frame in operative relation to said file, and connecting means for synchronous rocking of said elements, a lever for operating said advancing device, and coacting elements on said lever and on said connecting means to actuate said lever at about the completion of reciprocation of said oscillating means for operating said advancing device.

15. In a machine for grinding the teeth of an arcuate-tooth file, a work carriage adapted to hold the file, a grinding tool, oscillating means for supporting and arcuately reciprocating the grinding tool transversely across the file in grinding contact with a tooth thereof, and a device for advancing said carriage with said file thereon tooth by tooth with respect to said tool, said tool supporting and oscillating means including spaced journal supports, an element journalled in each support, a frame spaced above said carriage, pivotal connections between each end of said frame and the adjacent element being eccentric with respect to the journal axis of said element, and mounting means to support said tool on said frame in operative relation to said file, and connecting means for synchronous rocking of said elements, a lever for operating said advancing device, and coacting elements on said lever and on said connecting means to actuate said lever at about the completion of reciprocation of said oscillating means for operating said advancing device, and means selectively to predetermine the length of stroke of advance of said advancing device so as to conform to the spacing of the teeth of said file.

THOMAS W. BEYER.

REFERENCES CITED

The following references are of record in the file of this patent:

UNITED STATES PATENTS

| Number | Name | Date |
| --- | --- | --- |
| 1,131,999 | Denley et al. | Mar. 16, 1915 |
| 2,151,204 | Hartman | Mar. 21, 1939 |
| 2,212,999 | Faulder | Aug. 27, 1940 |
| 2,222,034 | Jackson | Nov. 19, 1940 |
| 2,375,703 | Swartzwelder | May 8, 1945 |

FOREIGN PATENTS

| Number | Country | Date |
| --- | --- | --- |
| 15,322 | Great Britain | June 30, 1909 |
| 131,637 | Switzerland | Mar. 16, 1915 |